United States Patent [19]

Songer

[11] Patent Number: 4,593,310

[45] Date of Patent: Jun. 3, 1986

[54] VIDEO CHROMA CONTROLLER GATING CHROMINANCE SIGNALS BY THE LUMINANCE SIGNAL

[75] Inventor: Jimmie D. Songer, Burleson, Tex.

[73] Assignee: High Resolution Television, Inc, Los Angeles, Calif.

[21] Appl. No.: 534,837

[22] Filed: Sep. 22, 1983

[51] Int. Cl.$^4$ ............................................. H04N 9/64
[52] U.S. Cl. ...................................... 358/37; 358/40
[58] Field of Search ............................. 358/27, 37, 40

[56] References Cited

U.S. PATENT DOCUMENTS

| | | | |
|---|---|---|---|
| 3,778,543 | 12/1973 | Lowry | 358/37 |
| 3,968,516 | 7/1976 | Dal Santo et al. | 358/27 |
| 4,183,051 | 1/1980 | Richman | 358/37 |
| 4,296,433 | 10/1981 | Rzeszewski | 358/37 |

FOREIGN PATENT DOCUMENTS 97786  7/1980  Japan ...................................... 358/37
115785  9/1980  Japan ...................................... 358/40

OTHER PUBLICATIONS

Alfred Schroeder, "System for Recovering Color Television Signal Fine Detail . . . " RCA Technical Notes, TN 1266, Dec. 1980.

*Primary Examiner*—John W. Shepperd
*Attorney, Agent, or Firm*—Freilich, Hornbaker, Rosen & Fernandez

[57] ABSTRACT

Color picture resolution is improved in a color television display system by threshold detecting the luminance signal, and, in response to the threshold detected luminance signal, switching the color signals off when the luminance signal is below a predetermined threshold level. Nonlinear amplifiers which couple the color signals to the display system are provided with gain that decreases as signal amplitude increases to restore color signal pulses to a form commensurate with the luminance signal fast rise and fall times.

4 Claims, 2 Drawing Figures

VIDEO CHROMA CONTROLLER GATING CHROMINANCE SIGNALS BY THE LUMINANCE SIGNAL

BACKGROUND OF THE INVENTION

This invention relates to color television receivers, monitors and other similar color television display systems, and more particularly to improving color resolution.

In a color television camera, three or four camera tubes are synchronized, each of three with separate one of red, green, and blue filters. In a three-tube camera, the red, green, and blue signals from the three primary color camera tubes are combined to produce a luminance (white) signal, designated Y. In a four-tube camera, one camera tube tube is used without a filter to generate the luminance signal directly. The color signals, are then encoded using a color subcarrier to produce two quadrature signals designated I and Q. These three signals, I, Q and Y, are then combined with synchronizing signals in a composite video signal modulated onto a carrier. A burst of the color carrier used in the color encoding process is modulated onto the carrier during line scan blanking periods so that it can be received and used as a "color burst" to synchronize a local oscillator, the output of which is then used as a color reference in decoding the I and Q signals into the primary color signals applied to the display unit with the luminance signal Y for reproducing the video image.

Since the bandwidths of the luminance and chrominance signals are markedly distinct, different low-pass filters are required: for the I signal, 1.3 MHz bandwidth; and for the Q signal, 0.5 MHz bandwidth; while the Y luminance signal having an 8.0 MHz bandwidth is generally filtered to about 4.2 MHz. As a consequence, delays are required at the encoder to bring the three signals into relative phase with each other prior to modulation on the carrier at the transmitter. Because the lower bandwidth signal encounters the greatest filter delay, the I signal must be delayed typically 0.2 μs, and the Y signal must be delayed typically 1.2 μs to compensate. Similar compensating delays must be used in the receiver.

While compensating delays will align the chrominance and luminance signals at the color television display system, the signal pulses which make up the image in color do not have the same rise and fall time. It is well known that the greater the frequency bandwidth the shorter the rise and fall time. For example, a perfect square wave signal requires an infinite number of harmonics of the fundamental frequency. As the bandwidth is limited more and more, the rise and fall times increase, and the square wave degenerates towards a sinusoidal waveform of the fundamental frequency. For example, the luminance signal will have a higher frequency response to scanning a red picket fence in full color than the chrominance signals, i.e., shorter rise and fall times at the edges of the picket fence slats will cause miscoloring of the leading and lagging edges due to saturation losses in the rise and fall time of the color signals. This results in deteriorated full color definition of the slats at their edges. It should, of course, be realized that because of the finite diameter of the scanning beam at the camera, even the luminance signal will not be a square waveform, but will instead have a waveform that is deteriorated toward the fundamental, but in phase with the ideal square waveform. This effect is known as "aperture distortion." Nevertheless, it would be desirable to effectively increase the frequency response (rise and fall times) of the color signals to that of the luminance signal for a more crisp display of the edges of images, thereby greatly enhancing the horizontal resolution of color television.

SUMMARY OF THE INVENTION

In accordance with the present invention, the detected luminance signal Y aligned with the color signals at the color television display device is employed to gate the color signals separately to the display device. The color signals are derived from the normal I and Q chrominance signals which are then matrixed to R−Y, B−Y and G−Y, and gated at the input to the color televison display device by the luminance signal that is threshold detected to produce a gate signal of predetermined voltage level sufficient to turn on switches (series or shunt) for each of the color signals to block the color signals from the display device, except during the presence of a luminance signal above a predetermined threshold level that is referenced to the horizontal sync pulse which is a constant voltage reference for the receiver. In that way, skirts of the color signals which extend outside the area of the luminance signal will be cut off, and all image color will be displayed within the boundaries of the image luminance. The color signal switches are connected to nonlinear amplifiers for amplitude compression of the color signals. These amplifiers have a decreasing gain as the color signal increases in amplitude to fill out the color signals to the form of the luminance signal, but each color signal will still be of independent amplitude proportional to the intensity of the particular color in the image.

The novel features of the invention are set forth with particularity in the appended claims. The invention will best be understood from the following description when read in connection with the accompanying drawings.

DESCRIPTION OF PREFERRED EMBODIMENTS

Figure 1:
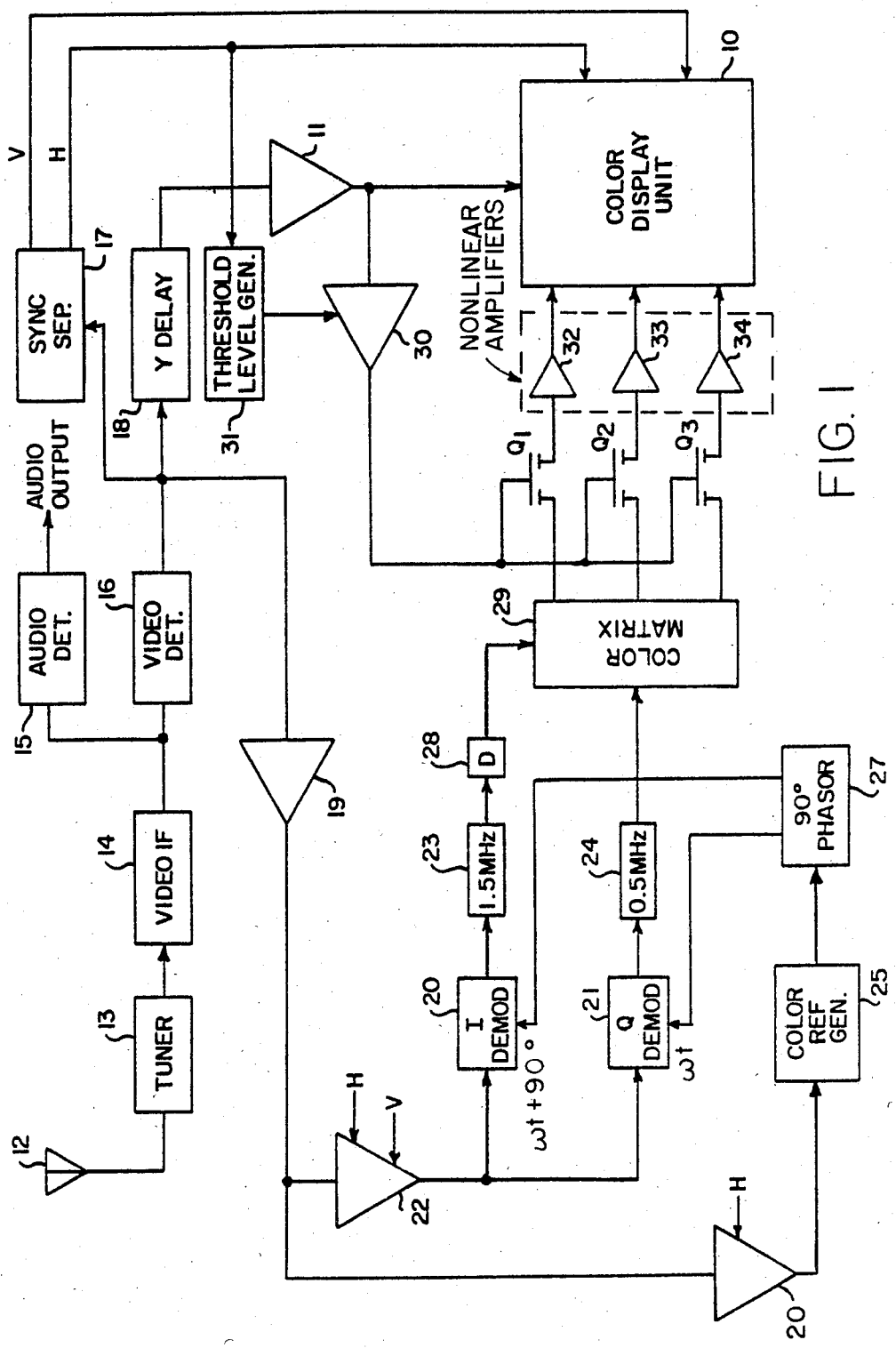
FIG. 1 is a functional block diagram of a conventional television receiver incorporating the present invention.

Referring now to FIG. 1, which shows only so much of a conventional color television receiver as necessary, it should be understood that the indicated color television display device 10 may be any type of display device, but for purposes of understanding the present invention in an exemplary embodiment, the device may be regarded as a color television picture tube having three grids for the respective R−Y, G−Y and B−Y color signals, and three cathodes, one for each grid, driven together by the luminance signal Y through an amplifier 11 to control brightness. The three electron beams thus generated in separate "guns" are equally spaced (120°) around the picture tube axis and aligned so that, as the electron beams are deflected in unison in scanning horizontal lines, they impinge the separate triad of phosphor dots that make up the picture elements (pixels). A similar arrangement of three color electron beam guns is provided for a Trinitron-type color display device having vertical phosphor strips. However, the invention is not limited to having picture tubes with electron beams, but rather may apply to any system of display with the three fundamental colors arranged to form the pixels.

The television carrier signals received through an antenna 12 (or cable) are processed through a tuner 13 to convert a selected carrier to an intermediate frequency, IF, which is then processed through a video IF amplifying strip 14. From there it is applied to an audio detector 15 to provide an audio output signal to power amplifiers and speakers, and a video detector 16 to detect the composite video signal that contains not only the chrominance signals (I, Q), but also the luminance signals (Y) and blanking signals (H, V). The latter are detected by a separator to provide horizontal and vertical blanking signals to the display device. These planking signals effectively turn off the color electron beams while retracing after a line has been scanned, and retracing after a field of 262.5 lines have been scanned.

The composite video signal is applied to the color television display device as a broad band (about 4.2 MHz) luminance signal Y through a delay element 18 and the luminance amplifier 11. The composite video signal is also applied through a bandpass amplifier 19 to color (I and Q) demodulators 20, 21. An amplifier 22 may be employed to block the composite signal during blanking intervals in response to H and V sync pulses.

The color reference for demodulation of the color signals I and Q is derived from a local oscillator 25 synchronized with color bursts transmitted to the receiver during the horizontal blanking intervals, i.e., during the periods of horizontal sync pulses, H, applied to a gating amplifier 26. A 90° phasor divides the color reference into quadrature signals of the proper phase for demodulating the color encoded signals I and Q.

The I demodulator produces the color signal R−Y, while the Q demodulator produces the color signal B−Y. Since the bandwidth of the color signals are 0 to 1.5 and 0 to 0.5 MHz, respectively, filters 23 and 24 are included with corresponding pass bands in the respective color signal channels. The problem which the invention solves arises because these filters not only delay the signals but also degrade rise and fall times of the signals.

The signal B−Y with lowest frequency bandwidth is delayed the longest and degraded the most by its filter 24. Consequently, the other signals Y and R−Y must be delayed to restore their coincidence in time. The signal Y is not filtered, and thus experiences only the nominal delay of the bandpass amplifier 11, so a longer delay element 18 is provided in its channel than a delay 28 in the R−Y channel.

Figure 2:
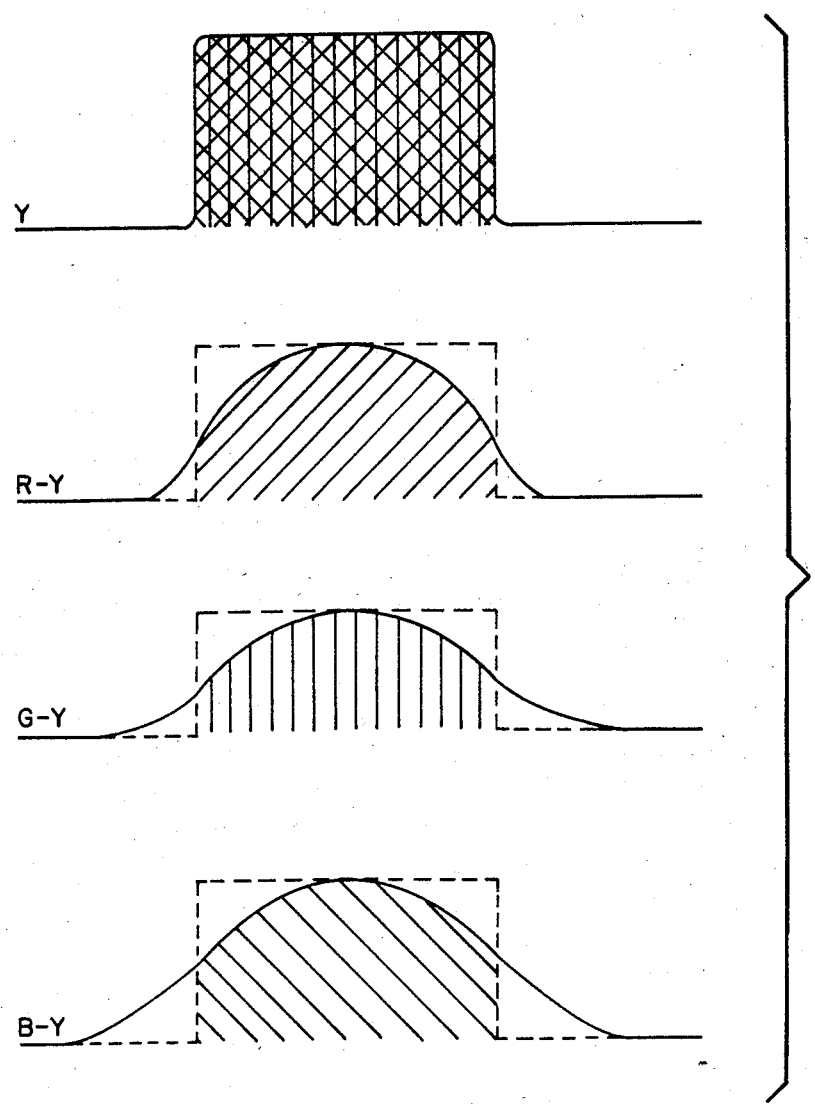
FIG. 2 illustrates graphs that show the benefit to be derived from the present invention.

The delays are adjusted for a vertical picketfence signal to bring the centers of all signals into time coincidence as shown in FIG. 2. But note that the bandpass amplifier 11 of the luminance signal will transmit a more nearly square wave signal to the display device, while the filters 23 and 24 transmit R−Y and B−Y signals that are degenerated from the near ideal square waveform of the luminance signal Y. This is due to the rise and fall times of the filters. It should be noted that the signal G−Y is normally derived through a color matrix 27 as a function of R−Y and G−Y from the following equation:

$$G-Y = 0.51(R-Y) - 0.19(B-Y)$$

Since the signal R−Y makes the larger contribution to the signal G−Y, the deterioration of the signal G−Y is not as extensive as for the signal B−Y, but more than for the signal R−Y. It should also be noted that the signals R−Y and B−Y would normally start the rise time in coincidence with the rise time of the signal Y, and complete the fall time significantly after that of the signal Y, but the delay elements 25 and 18 center the pulses as shown in FIG. 2 to divide the differences equally in front and in back of the luminance pulse for a picket-fence pulse.

The rise and fall times shown are exaggerated for illustration of the problem solved by this invention. The problem is a spreading of the color signals outside the image area of the luminance signal, which degrades the color image display. The solution to the problem is to switch on the color signals R−Y, G−Y and B−Y only during the presence of a luminance signal of predetermined threshold level using suitable switches, such as electronic "knife" switches comprised of MOSFET transistors $Q_1$, $Q_2$ and $Q_3$ driven by a low threshold amplifier 30 the threshold level of which is established by the horizontal sync pulse, or the blanking pedestal which defines the block level for the luminance signal in an adjustable threshold level generator 31. This generator may be comprised of a storage capacitor for the sync pulse or blanking pedestal level and an adjustable voltage divider for setting the threshold above the level stored from line to line just above the black level sufficiently to eliminate noise from blocking the color signals. This effectively limits the active periods of the color signal to the period of the luminance pulse. The elimination of the skirts on either side of the color signal pulses will greatly enhance the resolution of color television by restricting the pixels to the boundaries of the image as determined by the boundaries of the luminance signal.

The outputs of the switches $Q_1$-$Q_3$ are connected to the color display device by compression amplifiers 32-34 for nonlinear correction of the color signal amplitudes. Such a compression amplifier may be simply a nonlinear amplifier which has decreasing gain for increasing signal amplitude. This will tend to fill out the color signals to the form of the luminance signal Y, i.e., fill in the corners in the waveform shown in FIG. 2. The amplifier will thus produce an independent signal for each color of an amplitude proportional to the intensity of the color in the image.

As is well known, the NTSC system adopted in the United States has 525 lines per frame divided into two interlaced fields of 262.5 lines. However, it should be understood that the present invention is not limited to television display according to the NTSC standards. The invention is applicable to other standards, such as SECAM and PAL, which employ similar color encoding and decoding techniques.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for improving the resolution of color television display in a television system having a broad bandwidth luminance signal and color signals bandwidth limited by filters just prior to display on a device, comprising the steps of detecting when the luminance signal is above a predetermined threshold level, and in response to the threshold detected luminance signal, switching off the color signals applied to said display device while said luminance signal is below said threshold level.

2. A method as defined in claim 1 including the step of amplifying said color signals through nonlinear amplifiers in which gain decreases with signal amplitude.

3. Apparatus for improving the resolution of color television display in a television system having a broad bandwidth luminance signal and chrominance signals bandwidth limited by fliters just prior to display on a device comprising, means for detecting when the luminance signal is above a predetermined threshold level, and means for switching off the chrominance signal applied to said display device in response to said threshold detecting means while said luminance signal is below said threshold level.

4. Apparatus as defined in claim 3 including a nonlinear amplifier coupling said color signals from said switching means, said amplifiers each having a decreasing gain with increasing signal amplitude.

* * * * *